Patented Mar. 28, 1939

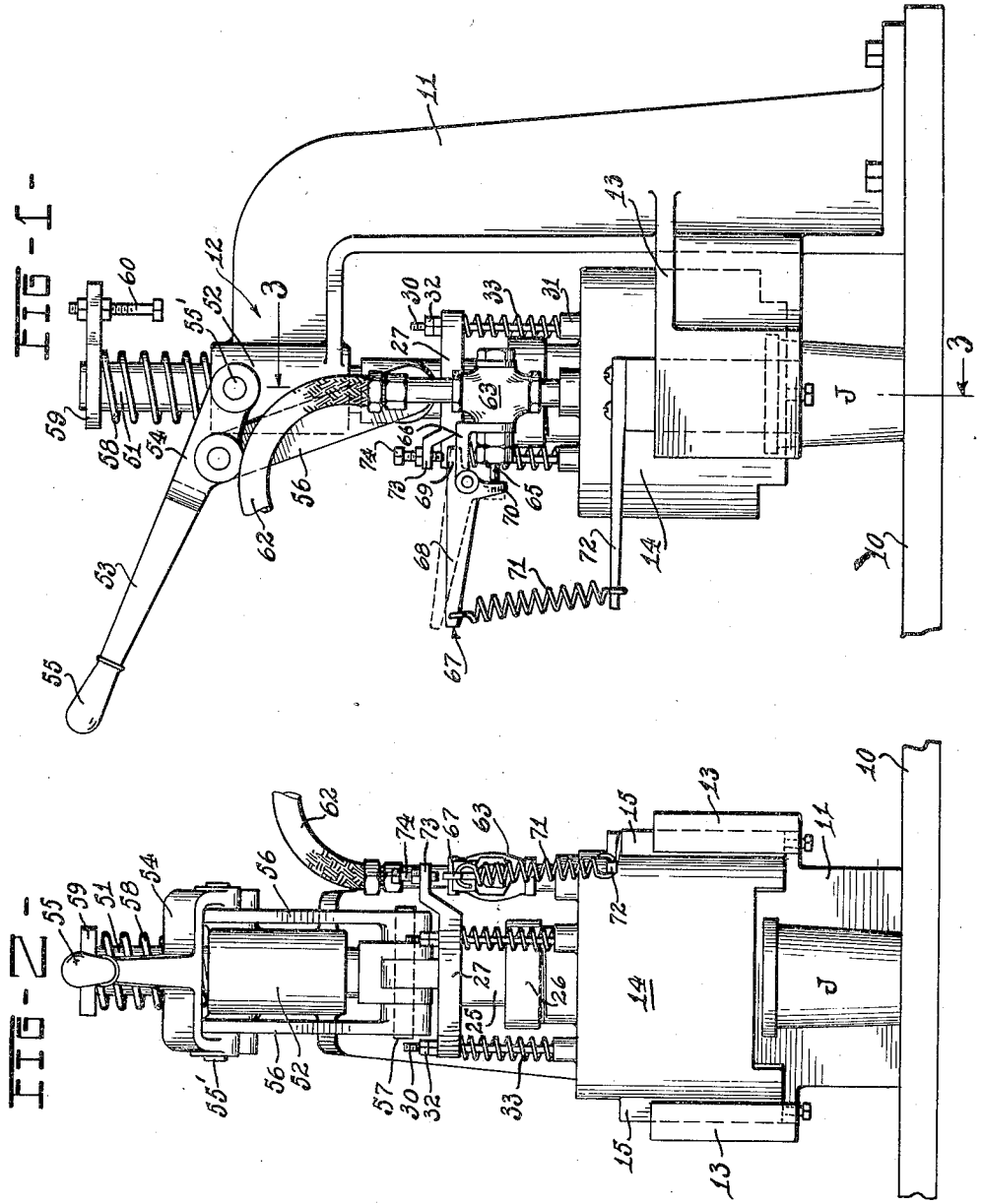

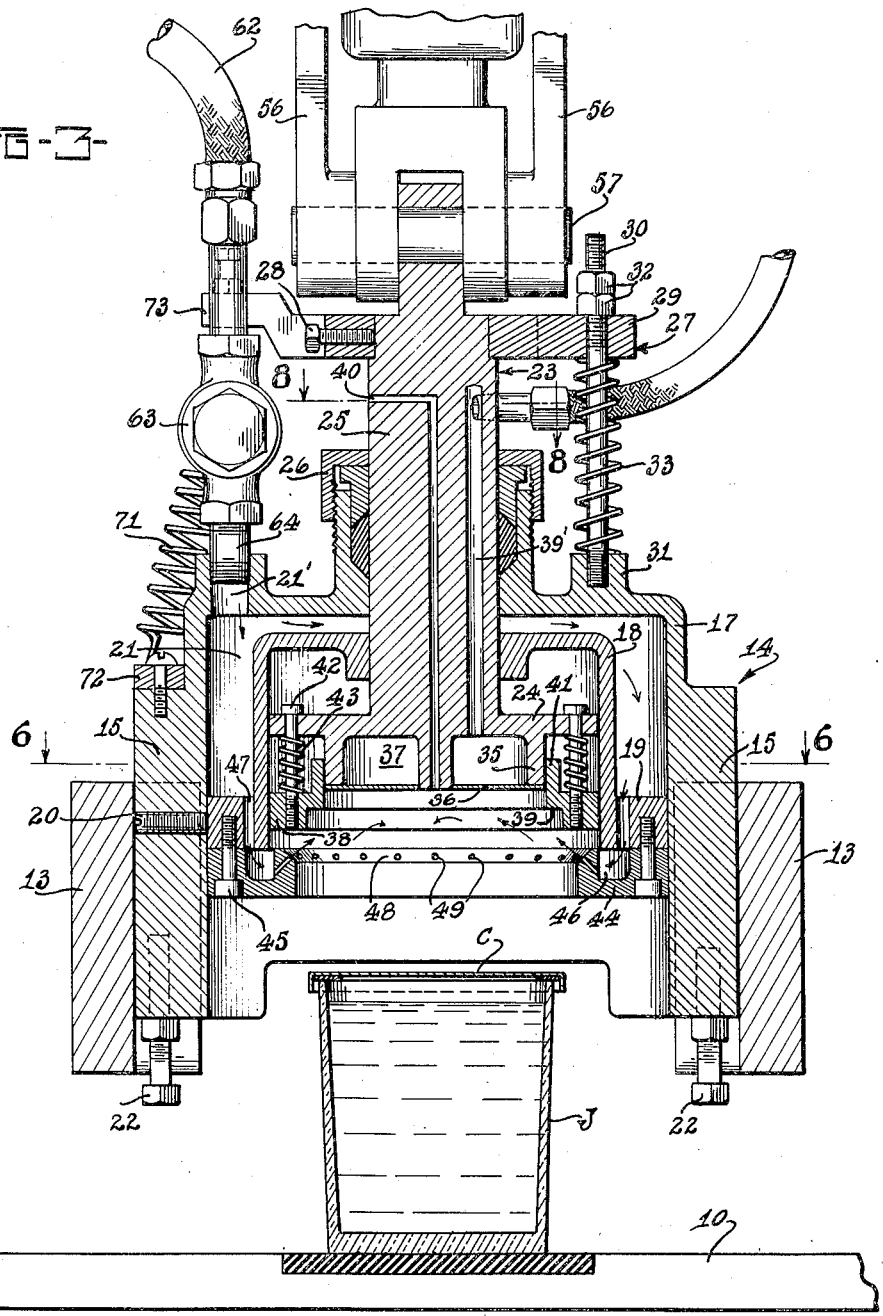

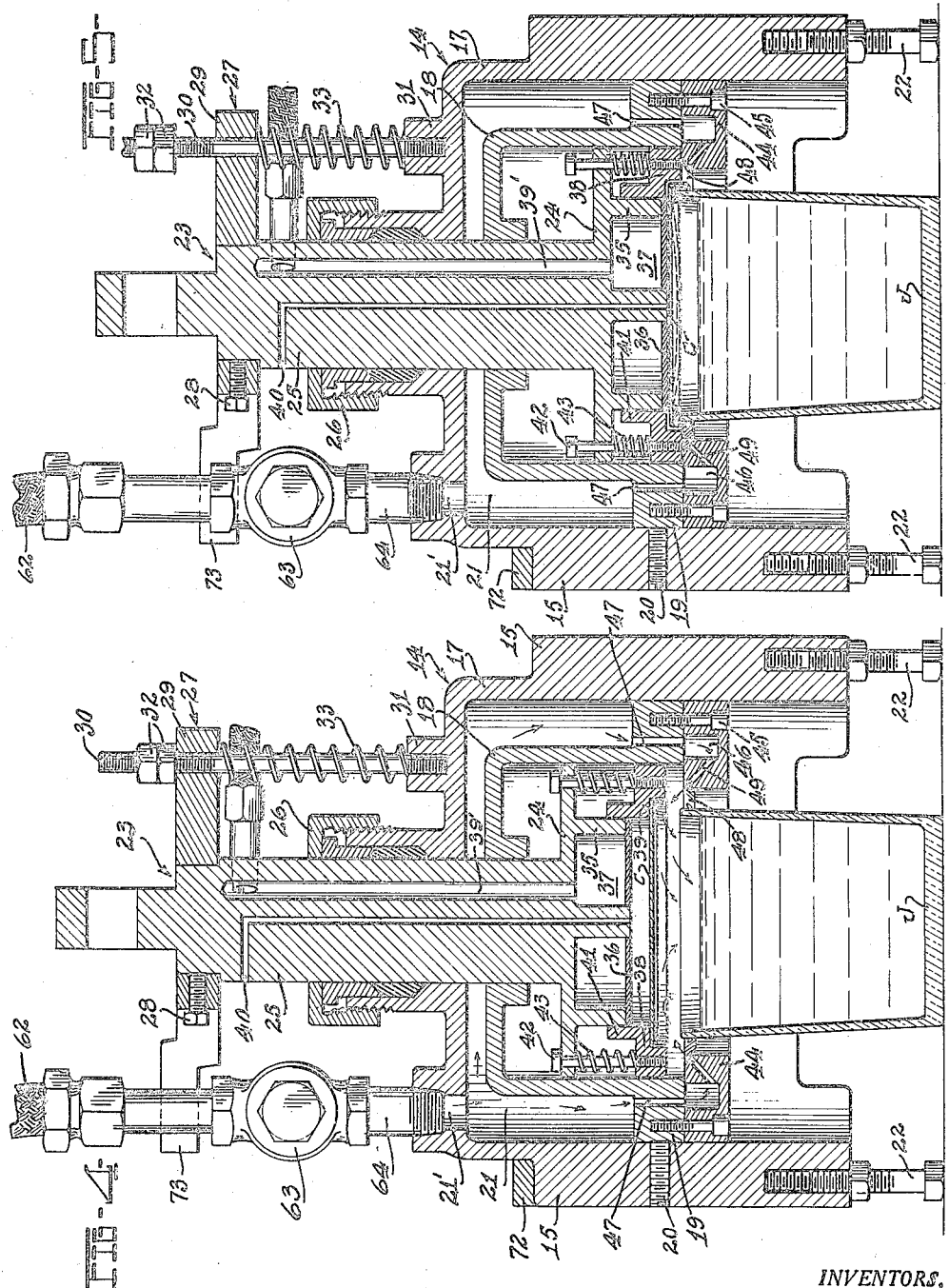

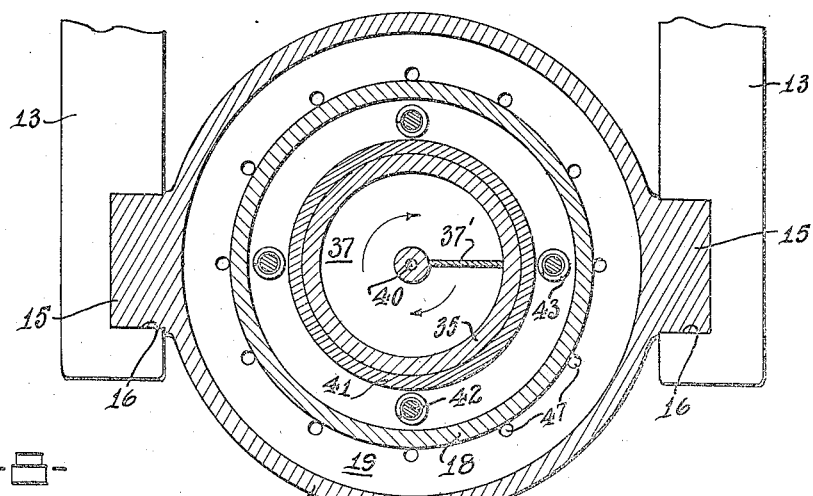
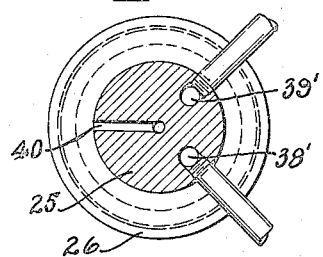
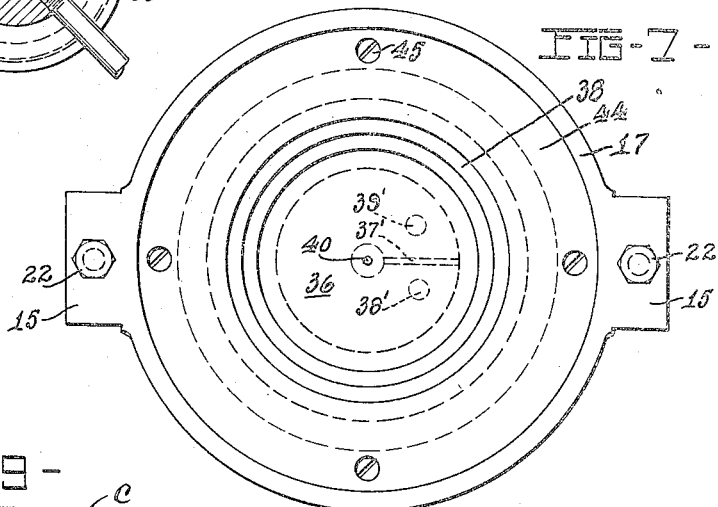
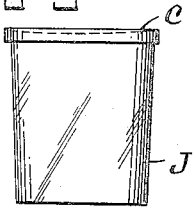
March 28, 1939. L. R. N. CARVALHO ET AL 2,152,534
METHOD AND APPARATUS FOR APPLYING CLOSURES TO RECEPTACLES
Filed Aug. 29, 1936 4 Sheets-Sheet 4
L. R. N. Carvalho,
Chas. F. Schmidt,
INVENTORS,
BY Rule & Hoge
ATTORNEYS.

2,152,534

UNITED STATES PATENT OFFICE 2,152,534

METHOD AND APPARATUS FOR APPLYING CLOSURES TO RECEPTACLES

Leslie R. N. Carvalho and Charles F. Schmidt, Toledo, Ohio, assignors to Owens-Illinois Glass Company, a corporation of Ohio Application August 29, 1936, Serial No. 98,498

13 Claims. (Cl. 226—82)

The present invention relates to an improved method of and apparatus for sealing closures to receptacles and is primarily designed for use in the application of flanged disk-like closures or covers to comparatively wide mouthed receptacles such as tumblers, jars and the like in the vacuum sealing thereof.

Heretofore in the application of such closures to open-ended receptacles in the vacuum sealing thereof, complicated and expensive machinery including vacuum pumps and other vacuum producing instrumentalities, which in some cases form a part of the apparatus and which in other cases are mounted externally thereof, have been employed. In this type of machinery, vacuum losses due to faulty pumps and other vacuum producing devices, are frequent, and efforts to improve the efficiency of the vacuum employed have been made by the application of heat to the receptacles and the contents thereof. The necessity of handling the hot receptacles, together with the fact that a partial cooling of the receptacles invariably occurs in the sealing machine prior to application of the closures, prevents the attainment of ideal sealing conditions except possibly in connection with products requiring a very low vacuum.

The principal object of the present invention is to overcome the above noted limitations in the sealing of receptacles by the provision of a simplified machine which will effectively produce a high vacuum for sealing purposes without necessitating pre-heating of the receptacles and contents thereof and without the aid of mechanical vacuum producing instrumentalities.

Convenience of arrangement of parts resulting in a simplification of the apparatus employed and in a corresponding reduction in the cost of manufacture, together with an increase in the speed of production of the apparatus, are further desiderata that have been borne in mind in the production and development of the present invention.

Other objects and advantages of the invention will become apparent hereinafter.

In the accompanying drawings:

Fig. 1 is a side elevational view of a closure applying apparatus manufactured in accordance with the principles of the present invention.

Fig. 2 is an end view of the apparatus shown in Fig. 1.

Fig. 3 is a sectional view taken substantially along the line 3—3 of Fig. 1.

Fig. 4 is a sectional view similar to Fig. 3 illustrating the manner in which steam is applied to the interior of the receptacle prior to application of the closure thereto.

Fig. 5 is a sectional view similar to Fig. 4 showing the manner in which the closure is applied to the receptacle.

Fig. 6 is a sectional view taken substantially along the line 6—6 of Fig. 3.

Fig. 7 is a bottom plan view of a closure applying head employed in connection with the present invention.

Fig. 8 is a sectional view taken substantially along the line 8—8 of Fig. 3.

Fig. 9 is a side elevational view of a receptacle that has been sealed in accordance with the principles of the present invention.

The apparatus is bolted or otherwise secured to a support or table 10 and includes a vertically extending standard 11 provided with a forwardly extending overlying portion 12 and with a pair of medially located forwardly extending supporting arms 13. A vertically movable substantially cylindrical closure applying head 14, provided with diametrically opposed outwardly extending vertical ribs 15 which are slidably received in opposed slideways 16 provided on the inner sides of the arms 13, is mounted for vertical sliding movement between the arms 13 and overlies that portion of the table 10 upon which the jars J or other receptacles are positioned for cooperation with the closure applying head 14.

Referring particularly to Fig. 3, the closure applying head consists of an inverted cup-shaped outer shell 17 and an inner shell 18 of similar form. A circumferential flange 19 extends around the rim of the inner shell 18 and a set screw 20 extending through the wall of the outer shell 17 serves to hold the two shells in fixed concentric relationship. The inner shell 18 is of smaller dimensions than the outer shell 17 and the annular space 21 existing between the two shells provides a steam chamber the function of which will appear later. Steam under relatively low pressure is admitted to the chamber 21 through a steam inlet 21' provided in the upper portion of the outer shell 17.

The downward limiting position of the closure applying head 14 is determined by means of set screws 22 threadedly received in the rim of the outer shell 17, the heads of which set screws are adapted to bear against the upper side of the platform 10 when the head is in its lowermost position.

Extending centrally through the inner and outer shells 18 and 17 respectively, is a vertically movable plunger 23 provided with a pressure plate 24 disposed within the inner shell 18 and a stem 25 which passes through a packing gland 26 provided on the outer shell.

The upper end of the plunger 23 is provided with a collar 27 which is secured thereto by means of a set screw 28. A plurality of diverging arms 29 are formed on the collar 27 and guide rods 30, the lower ends of which are anchored in bosses 31 formed on the outer shell 17, extend through the arms 29. The upper ends of the guide rods 30 are threaded and a pair of vertically adjustable nuts 32 received on the threaded portions of each rod 30 serves to limit the upward position of the plunger 23 with respect to the head 14. Coil springs 33 mounted on the guide rods 30 serve to normally urge the plunger 23 into its uppermost position wherein the pressure plate 24 occupies its uppermost position relative to the head 14 within the inner shell 18.

The pressure plate 24 is provided with a downwardly extending annular pressure ring 35 which is integrally formed therewith. A relatively thin circular heat exchange contact plate 36, preferably formed of a noncorrosive metal such as copper, brass, etc., is secured at its periphery to the lower edge of the pressure ring 35. This plate 36, together with the pressure plate 24 and pressure ring 35, provides a cooling chamber 37, the function of which will be subsequently set forth. A baffle plate 37' (Fig. 6) is provided in the cooling chamber 37 and a cooling medium such as circulating water is introduced into the chamber 37 on one side of the baffle plate 37' through an axial duct 38' extending through the stem 25 of the plunger 23, and is expelled therefrom through a similar axial duct 39'.

An independently and vertically movable closure applying ring 38 is disposed within the inner shell 18. The ring 38 is provided with an internal shoulder 39, the external diameter of which is slightly greater than the diameter of a closure member C which is to be applied to the jar J, and against which the closure C is adapted to be held by the action of a series of steam jets prior to the application of the closure to the jar as will be subsequently described.

The space between the heat exchange contact plate 36 and the closure C, when the latter is in position on the shoulder 39, communicates with the atmosphere through an axial bore 40 extending through the stem 25 of the plunger 23.

A raised flange 41 formed on the closure applying ring 38 is in telescopic engagement with the pressure ring 35 and thus, the ring 38 is independently and vertically movable in the annular space existing between the pressure ring 35 and the inner circumferential wall of the inner shell 18. In its lowermost position within this annular space, when the pressure ring 35 is in its retracted or elevated position, the closure applying ring 38 is suspended from the pressure plate 24 by means of suspension bolts 42, the heads of which bear against the upper side of the pressure plate 24. Coil springs 43, disposed on the suspension bolts 42, serve to normally urge the closure applying ring 38 into its lowermost position as shown in Fig. 3.

A fixed steam distributing ring 44 is secured by means of bolts 45 to the lower side of the annular flange 19 on the inner shell 18. The distributing ring 44 has formed therein an annular steam chest 46 which communicates with the steam chamber 21 through a series of ports 47 extending vertically through the flange 19.

The inner and upper edge of the distributing ring 44 is beveled as at 48 and a plurality of upwardly and inwardly inclined steam passages 49 communicating with the steam chest 46 extend through the inner portion of the ring 44 and provide a series of steam jets which issue from spaced points around the margin of the beveled portion 47.

Referring now to Figs. 1, 2 and 3, the entire closure applying head 14 is suspended from the standard 11 by means of a vertically extending shaft 51 which is vertically slidable in a guide 52 formed on the horizontal overlying portion 12 of the standard 11, and to the lower end of which shaft the upper end of the plunger stem 25 is secured.

In order to elevate or lower the closure applying head 14 manually, a lever 53 having a forked end 54 is pivoted to a pair of trunnions 55' which extend outwardly from the guide 52. The outer end of the lever 53 is provided with a handle 55. A pair of toggle links 56 have their upper ends connected to the forked portions of the lever 53 and their lower ends are connected to the upper end of the stem 25 of the plunger 23 by means of a pin 57 which extends through the toggle links 56 and passes through both the lower end of the shaft 51 and the upper end of the stem 25.

The shaft 51, together with the plunger 23, is normally maintained in its elevated position by means of a coil spring 58 which surrounds the shaft 51 and bears against the guide 52 at its lower end and against a plate 59 at its upper end. A set screw 60 threadedly received in the plate 59 is adapted to engage the upper portion of the standard 61 and limit the downward movement of the shaft 51.

Referring now to Figs. 1 and 3, a steam line 62 communicates with the steam inlet 21' through a normally closed valve 63 which is provided with a fitting 64 for reception in the inlet. The valve 63 is provided with a valve stem 65 which projects from the casing of the valve and which, when retracted, maintains the valve in its open position to permit steam to enter the chamber 21. Extension of the stem 65 from the valve casing serves to close the valve 63 and shut off the supply of steam to the chamber 21.

The valve 63 is adapted to remain open during such time as the plunger 23 is in its elevated position or in a partially depressed position and is adapted to become closed only when the plunger 23 is in its fully depressed position during actual application of the closure C to the jar J. Toward this end, the casing of the valve 63 has secured thereto a bracket 66 to which there is pivoted a lever 67 having a long arm 68, a short arm 69 in alignment therewith, and a depending short arm 70 adapted to engage the valve stem 65 to actuate the same. The valve stem 65 is normally maintained in its retracted position by means of a coil spring 71 which is connected at one end to the outer end of the long arm 68 and at the other end to a stationary bracket 72 attached to a convenient point on the outer shell 17. A bracket 73 formed on the collar 27 overlies the short arm 69 of the lever 67 and a set screw 74 extending through the bracket 73 is adapted to engage the short arm 69 to depress the same and tilt the lever 67 to the dotted line position shown in Fig. 1 upon movement of the plunger 23 to its extreme lowermost position during actual application of the closure C to the jar J. In such dotted line position of the lever 67, the valve stem 65 becomes extended and the valve 63 becomes temporarily closed to shut off the supply of steam to the chamber 21.

In the operation of the apparatus, the jar J or other receptacle to be sealed, which has been partially filled with the perishable foodstuff to be preserved to a level within a short distance of the top of the jar, is placed upon the support or table 10 directly beneath the closure applying head 14 with the closure C loosely applied thereto. In order to assist in centering the jar beneath the head and to absorb any undue shocks thereto, a rubber centering pad 75 is embedded in the surface of the support or table 10.

With the jar thus centered, the operator engages the handle 55 and depresses the lever 53, thus lowering the closure applying head 14 through the medium of the toggle links 56 and plunger 23 from which the head is suspended. Prior to and during this lowering operation, the valve 63 is open and steam is continuously conducted through the valve 63 to the interior of the steam chamber 21 from whence it passes through the vertically extending ports 47 and into the annular steam chest 46 to be discharged through the passages 49 in the form of a series of circumferentially spaced jets 47.

In order to insure proper operation of the apparatus, the downward movement of the lever 53 is performed with a slow and even stroke. When the closure applying head 14 is lowered to such an extent that the set screws 22 provided on the lower edge of the outer shell 17 engage the surface of the table and prevent further downward movement of the head, the compression of the springs 33, which normally urge the plunger 23 into its uppermost position relative to the head, is felt by the operator and at this point the operator may pause momentarily before depressing the lever 53 to the full extent of its downward movement.

At this stage of the operation, the steam which issues continuously from the passages 49 in the form of the jets 50 is directed beneath the circumferential sealing flange of the closure C in such a manner that the closure is literally blown off of the jar on which it is loosely disposed and is forced against the shoulder 39 provided on the closure applying ring 38. Steam or air entrapped between the closure C and plate 36 escapes through the vent 40 thus permitting the closure to be quickly lifted from the jar. The closure C is maintained in contact with the shoulder 39 momentarily while the jets 49 are directed beneath the closure C in the manner shown in Fig. 4 to fill the upper unfilled portion of the jar with steam.

Further depression of the lever 53 lowers the plunger 23 into the closure applying head 14 against the action of the springs 33, thus carrying the pressure plate 24 and closure applying ring 38 downwardly until such time as the closure C is returned to the upper rim of the jar.

Movement of the lever 53 to its lowermost position serves to further lower the plunger 23 against the action of the coil springs 33 and 43, which latter springs become compressed as the pressure plate 24 is lowered relative to the closure applying ring 38. Such relative movement between the pressure plate 24 and the ring 38 which has finally been lowered to such an extent that the closure is in position on the jar, causes the heat exchange contact plate 36 to engage the closure C.

Inasmuch as cooling water is continuously circulated in the cooling chamber 37 and inasmuch as the plate 36 is formed of a material which is a good heat conductor, much of the heat contained in the steam that has been entrapped within the jar is conducted away by the cooling water in the chamber 37 and thus a partial vacuum, sufficient to draw the closure C firmly onto the jar, is created within the jar.

During the final movement of the lever 53 downwardly, the set screw 74 carried by the bracket 73 which overlies the short arm 69 of the pivoted lever 67, tilts the lever 67 to the dotted line position thereof shown in Fig. 1 to permit the valve stem 65 of the valve 63 to become extended to close the valve and shut off the supply of steam to the chamber 21.

The closure applying and sealing operation having been completed, the operator elevates the lever 52 to its fullest extent and removes the sealed jar from the rubber centering pad 75 prior to substitution of an unsealed jar in its stead. The jar which has been removed may not be vacuumized to its fullest extent immediately upon removal from the apparatus. However subsequent cooling by the surrounding atmosphere improves the vacuum therein.

Modifications may be resorted to within the spirit and scope of the appended claims.

We claim:

1. The method of sealing a relatively widemouthed, partially filled, open-ended receptacle which consists in loosely applying a closure to the open end of said receptacle, directing a stream of hot gas against the underneath side of said closure to lift the closure from the receptacle and fill the unfilled portion of the receptacle with got gas, and moving the closure and receptacle into engagement to entrap the hot gas therein.

2. The method of sealing a relatively widemouthed, partially filled, open-ended receptacle which consists in loosely applying a closure to the open end of said receptacle, directing a stream of hot gas against the underneath side of said closure to lift the closure from the receptacle and fill the unfilled portion of the receptacle with hot gas, and forcing the closure onto the receptacle to entrap the hot gas therein.

3. The method of sealing a relatively widemouthed, partially filled, open-ended receptacle which consists in loosely applying a closure to the open end of said receptacle, directing a stream of hot gas against the underneath side of said closure to lift the closure from the receptacle and fill the unfilled portion of the receptacle with hot gas, forcing the closure onto the receptacle to entrap the hot gas therein, and applying a cooling medium to the closure to conduct away the heat of the entrapped gas.

4. The method of sealing a relatively widemouthed, partially filled, open-ended receptacle which consists in loosely applying a closure to the open end of said receptacle, directing a series of opposed jets of steam against the underneath side of said closure to lift the closure bodily from the receptacle and fill the unfilled portion of the receptacle with steam, forcing the closure onto the receptacle and applying a cooling medium to the closure to condense the entrapped steam.

5. The method of sealing a relatively widemouthed, partially filled, open-ended receptacle which consists in loosely applying a closure to the open end of said receptacle, directing a series of circumferentially spaced, inwardly directed jects of steam against the underneath side of said closure to bodily lift the same from the receptacle and fill the unfilled portions of the receptacle with steam, and bringing the closure and receptacle into engagement to entrap the steam therein.

6. The method of sealing a relatively wide-mouthed, partially filled, open-ended receptacle which consists in loosely applying a circumferentially flanged closure to the rim of said receptacle, directing a series of circumferentially spaced, inwardly and upwardly directed jets of steam to the underneath side of said closure behind said flange to lift said closure bodily from the receptacle and fill the unfilled portions of the receptacle with steam, forcing the closure onto said receptacle in the presence of said steam, and applying a cooling medium to said closure to condense the steam thus entrapped by said closure in said receptacle.

7. In a device for applying closures to partially filled receptacles, a closure applying head, means for lowering and raising said head into operative association with a receptacle having a closure loosely positioned thereon, means operable upon lowering of said head for directing a stream of hot gas upwardly and inwardly against the underneath side of said closure to bodily lift the closure from the receptacle and fill the unfilled portions of the receptacle with hot gas, means for repositioning said closure on the receptacle to entrap hot gas therein, and means for applying a cooling medium to said closure.

8. In a device for applying closures to partially filled receptacles, a closure applying head, means for suspending said head above a receptacle having a closure loosely positioned thereon, means for lowering and raising said suspending means to move said head into and out of operative association with said receptacle, means operable upon partial lowering of said suspending means for directing jets of steam upwardly and inwardly against the underneath side of said closure to bodily raise the same from the receptacle and fill the unfilled portions of the receptacle with steam, means operable upon further lowering of said suspending means to reposition said closure on the receptacle to entrap a quantity of steam therein, and means operable upon still further lowering of said suspending means for bringing a cooling medium into contact with said closure.

9. In a device for applying closures to partially filled receptacles, a closure applying head, means for suspending said head above a receptacle having a closure loosely applied thereto, means for lowering and raising said suspending means to move said head into and out of operative association with said receptacle, means operable upon partial lowering of said suspending means for elevating said closure from the receptacle and for subjecting the unfilled portion of the receptacle to an atmosphere of steam, means operable upon further lowering of said suspending means for reapplying said closure to said receptacle to entrap a quantity of steam within the receptacle, and means operable upon still further lowering of said suspending means for bringing a cooling medium into contact with said closure.

10. The method of sealing a partially filled container which consists in loosely applying a cap thereto, positioning the container and cap, with the cap and at least a portion of the container in an enclosure, directing a stream of hot gas within the enclosure against said cap to elevate the same above the container, and at least partially fill the unfilled portion of the container with the hot gas while simultaneously maintaining a cooling plate within the enclosure at a temperature well below the condensation temperature of the gas, effecting relative movement between the cap and container to secure them together, and effecting relative movement between said cooling plate and the applied cap to bring the same into direct heat exchange relationship and convey away the heat of the entrapped gas.

11. The method of sealing a partially filled container which consists in loosely applying a cap thereto, positioning the container and cap, with the cap and at least a portion of the container in an enclosure, directing a stream of hot gas within the enclosure against said cap to elevate the cap above the container and thereby at least partially fill the unfilled portion of the container with the hot gas while simultaneously maintaining a cooling plate within the closure at a temperature well below the temperature of the hot gas, forcing the cap onto the container whereby to entrap the hot gas therein, and forcing the cooling plate into direct heat exchange relation with the applied cap to conduct the heat of the entrapped gas through said closure and away therefrom.

12. In a device for applying closures to partially filled, open ended receptacles, a closure applying head, means for lowering said head into operative association with a receptacle having a closure loosely positioned thereon, means operable upon lowering of said head for directing a stream of hot gas upwardly and inwardly against the underneath side of said closure to bodily lift the closure from the receptacle and fill the unfilled portions of the receptacle with hot gas, means for repositioning said closure on the receptacle to entrap hot gas therein, a cooling plate carried by said head, and means for cooling said plate, said plate being adapted upon movement of said head to its lowermost position to intimately engage the repositioned closure in direct heat exchange relation thereto.

13. In a device for applying closures to partially filled receptacles, a closure applying head, means for suspending said head above a receptacle having a closure loosely positioned thereon, means for lowering and raising said suspending means to move said head into and out of operative association with said receptacle, means operable upon partial lowering of said suspending means for directing jets of steam upwardly and inwardly against the underneath side of said closure to bodily raise the same from the receptacle and fill the unfilled portions of the receptacle with steam, means operable upon further lowering of said suspending means to reposition said closure on the receptacle to entrap a quantity of steam therein, a cooling plate carried by said head, and means for circulating a cooling medium in contact with said plate, said plate being adapted upon still further lowering of said suspending means to engage said closure in direct heat exchange relationship thereto.

LESLIE R. N. CARVALHO.
CHARLES F. SCHMIDT.